United States Patent

Fisk, Jr.

(10) Patent No.: US 9,587,162 B2
(45) Date of Patent: Mar. 7, 2017

(54) DRILLING FLUID CONTAINING A SURFACTANT HAVING A HIGH BOILING POINT AND A LONG CHAIN TAIL GROUP

(71) Applicant: HALLIBURTON ENERGY SERVICES, INC., Houston, TX (US)

(72) Inventor: James V. Fisk, Jr., Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 14/034,539

(22) Filed: Sep. 23, 2013

(65) Prior Publication Data

US 2014/0057810 A1   Feb. 27, 2014

Related U.S. Application Data

(62) Division of application No. 13/401,190, filed on Feb. 21, 2012.

(51) Int. Cl.
*C09K 8/36* (2006.01)
*B01F 17/00* (2006.01)

(52) U.S. Cl.
CPC ............ C09K 8/36 (2013.01); B01F 17/0021 (2013.01); B01F 17/0042 (2013.01)

(58) Field of Classification Search
CPC  C09K 8/035; C09K 2208/00; C09K 2208/28; C09K 8/50; C09K 8/528; C09K 21/08; C09K 2208/34; C09K 3/00; C09K 3/22; C09K 5/045; C09K 8/032; C09K 8/12; C09K 8/467; C09K 8/524; C09K 8/58; C09K 8/036; E21B 41/00; E21B 7/00; E21B 34/06; E21B 34/08; E21B 43/00; E21B 44/00; E21B 10/00; E21B 10/36; E21B 10/42; E21B 10/573; E21B 10/5735; E21B 17/028; E21B 19/00; E21B 19/08; E21B 19/22; E21B 21/103; E21B 21/12; E21B 23/02; E21B 23/04; E21B 23/06; E21B 28/00; E21B 29/02; E21B 29/08; E21B 33/12; E21B 33/1204; E21B 33/1208; E21B 33/14; E21B 33/16; E21B 34/063; E21B 37/00
See application file for complete search history.

(56) References Cited

U.S. PATENT DOCUMENTS

| | | | | |
|---|---|---|---|---|
| 2,285,291 A * | 6/1942 | Larsen | | E21B 43/04 166/278 |
| 2,996,450 A | 8/1961 | Zheck et al. | | |
| 3,002,923 A * | 10/1961 | Barker | | C09K 8/36 507/131 |
| 4,525,496 A * | 6/1985 | Adaway | | C08F 2/32 523/337 |
| 5,330,006 A * | 7/1994 | Nahm | | C04B 7/153 166/293 |
| 6,255,256 B1 * | 7/2001 | Van Slyke | | C09K 8/34 507/103 |
| 6,376,455 B1 * | 4/2002 | Friedli | | A61K 8/416 252/8.63 |
| 6,508,306 B1 | 1/2003 | Reddy et al. | | |
| 6,887,832 B2 | 5/2005 | Kirsner et al. | | |
| 7,278,485 B2 | 10/2007 | Kirsner et al. | | |
| 7,456,135 B2 | 11/2008 | Kirsner et al. | | |
| 7,462,580 B2 | 12/2008 | Kirsner et al. | | |
| 7,488,704 B2 | 2/2009 | Kirsner et al. | | |
| 7,534,743 B2 | 5/2009 | Kirsner et al. | | |
| 7,547,663 B2 | 6/2009 | Kirsner et al. | | |
| 7,645,723 B2 | 1/2010 | Kirsner et al. | | |
| 7,696,131 B2 | 4/2010 | Oyler et al. | | |
| 7,939,470 B1 * | 5/2011 | Wagle | | C09K 8/36 166/305.1 |
| 2003/0114316 A1 | 6/2003 | Patel et al. | | |
| 2004/0002426 A1 * | 1/2004 | Temple | | C09K 8/32 507/100 |
| 2006/0073987 A1 * | 4/2006 | Mueller | | C09K 8/36 507/136 |
| 2006/0252652 A1 * | 11/2006 | Cowan | | C09K 8/32 507/206 |
| 2010/0056402 A1 | 3/2010 | Li et al. | | |

(Continued)

FOREIGN PATENT DOCUMENTS

| | | |
|---|---|---|
| EP | 0108546 | 5/1984 |
| EP | 0514647 | 11/1992 |
| EP | 2036964 | 3/2009 |

OTHER PUBLICATIONS

Material Safety Data Sheet, MP Biomedicals, LLC.*
http://www.chemicalbook.com/ChemicalProductProperty_US_CB7262544.aspx downloaded on Jun. 2, 2014.*
http://www.chemicalbook.com/ChemicalProductProperty US CB7262544.aspx downloaded on Jun. 2, 2014.*
http://www.chemnet.com/Global/Products/n,nbis(2hydroxyethyl)isooctadec . . . Downloaded on Oct. 6, 2014.*
https://scifinder.cas.org/scifinder/view/substance/substanceDetail.jsf?nav=eNpb85aBtYSB . . . downloaded on Jan. 11, 2016.*
Product Data Sheet, ACCOLADE BASE, Halliburton Energy Services, Inc.
Product Data Sheet, ADAPTA, Halliburton Energy Services, Inc.
Product Data Sheet, BAROID, Halliburton Energy Services, Inc.
Product Data Sheet, BAROID ALKANE, Halliburton Energy Services, Inc.
Product Data Sheet, BARACARB, Halliburton Energy Services, Inc.

(Continued)

*Primary Examiner* — Kumar R Bhushan
(74) *Attorney, Agent, or Firm* — McGuireWoods, LLP

(57) ABSTRACT

According to an embodiment, an invert emulsion drilling fluid comprises: an external phase, wherein the external phase of the drilling fluid comprises a hydrocarbon liquid; an internal phase, wherein the internal phase of the drilling fluid comprises water; and a surfactant, wherein the surfactant: (A) comprises a hydrophobic tail group having a carbon chain length greater than or equal to 16; (B) has a boiling point greater than or equal to 400° F. (204.4° C.); and (C) is in at least a sufficient concentration such that the surfactant spontaneously forms reverse-micelles. According to another embodiment, a method of using the invert emulsion drilling fluid comprises: introducing the drilling fluid into a well.

18 Claims, No Drawings

(56) References Cited

U.S. PATENT DOCUMENTS

| | | | | |
|---|---|---|---|---|
| 2011/0036572 A1* | 2/2011 | Weaver | .................... | C09K 8/28 166/292 |
| 2011/0036573 A1* | 2/2011 | Weaver | .................... | C09K 8/36 166/295 |
| 2013/0020083 A1* | 1/2013 | Wagie | .................... | C09K 8/12 166/285 |

OTHER PUBLICATIONS

Product Data Sheet, BARODENSE, Halliburton Energy Services, Inc.
Product Data Sheet, DURATONE HT, Halliburton Energy Services, Inc.
Product Data Sheet, ENCORE BASE, Halliburton Energy Services, Inc.
Product Data Sheet, EZ MUL NT, Halliburton Energy Services, Inc.
Product Data Sheet, GELTONE V, Halliburton Energy Services, Inc.
Product Data Sheet, INVERMUL, Halliburton Energy Services, Inc.
Product Data Sheet, INVERMUL NT, Halliburton Energy Services, Inc.
Product Data Sheet, MICROMAX, Halliburton Energy Services, Inc.
Product Data Sheet, OMC 42, Halliburton Energy Services, Inc.
Product Data Sheet, PETROFREE, Halliburton Energy Services, Inc.
Product Data Sheet, SUSPENTONE, Halliburton Energy Services, Inc.
Product Data Sheet, TORQ-TRIM II, Halliburton Energy Services, Inc.
International Search Report and Written Opinion date mailed Apr. 16, 2013; International PCT Application No. PCT/US2012/071536.
"Higher Alkanes", Wikipedia, Mar. 26, 2013, pp. 1-4, XP055057815, retrieved from the Internet: URL:http://en/wikipedia.org/wiki/hier_alkanes [retrieved on Mar. 26, 2013].
"SIDS Initial Assessment Report for SIAM 25 Oct. 16-19, 2007, Helsinki", Oct. 19, 2007, pp. 1-230, XP055057799, Retrieved from the internet: URL:http://www.aciscience.org/docs/Alkyl_Sulfates-SIAR.pdf [retrived on Mar. 26, 2013].
Product Data Sheet, ACCOLADE BASE, Halliburton Energy Services, Inc., Apr. 1, 2010.
Product Data Sheet, ADAPTA, Halliburton Energy Services, Inc., Mar. 2, 2010.
Product Data Sheet, BAROID, Halliburton Energy Services, Inc., Mar. 25, 2010.
Product Data Sheet, BAROID ALKANE, Halliburton Energy Services, Inc., Mar. 25, 2010.
Product Data Sheet, BARACARB, Halliburton Energy Services, Inc., Mar. 24, 2010.
Product Data Sheet, BARODENSE, Halliburton Energy Services, Inc., Mar. 25, 2010.
Product Data Sheet, DURATONE HT, Halliburton Energy Services, Inc., Mar. 26, 2010.
Product Data Sheet, ENCORE BASE, Halliburton Energy Services, Inc., Apr. 5, 2010.
Product Data Sheet, EZ MUL NT, Halliburton Energy Services, Inc., Mar. 26, 2010.
Product Data Sheet, GELTONE V, Halliburton Energy Services, Inc., Mar. 26, 2010.
Product Data Sheet, INVERMUL, Halliburton Energy Services, Inc., Mar. 26, 2010.
Product Data Sheet, INVERMUL NT, Halliburton Energy Services, Inc., Mar. 26, 2010.
Product Data Sheet, MICROMAX, Halliburton Energy Services, Inc., Aug. 2007.
Product Data Sheet, OMC 42, Halliburton Energy Services, Inc., Mar. 26, 2010.
Product Data Sheet, PETROFREE, Halliburton Energy Services, Inc., Apr. 2, 2010.
Product Data Sheet, SUSPENTONE, Halliburton Energy Services, Inc., Mar. 30, 2010.
Product Data Sheet, TORQ-TRIM II, Halliburton Energy Services, Inc., Mar. 26, 2010.

* cited by examiner

DRILLING FLUID CONTAINING A SURFACTANT HAVING A HIGH BOILING POINT AND A LONG CHAIN TAIL GROUP

TECHNICAL FIELD

An invert emulsion drilling fluid and methods of using the drilling fluid are provided. The drilling fluid contains a surfactant having a high boiling point of at least 400° F. (204.4° C.). The surfactant comprises a hydrophobic tail group having a long chain of at least 16 carbons (C16). According to an embodiment, the tail group is highly branched. According to another embodiment, the surfactant is in at least a sufficient concentration such that the surfactant spontaneously forms reverse-micelles. A method of using the drilling fluid comprises introducing the drilling fluid into a well. According to certain embodiments, the well is a high-temperature well.

SUMMARY

According to an embodiment, an invert emulsion drilling fluid comprises: an external phase, wherein the external phase of the drilling fluid comprises a hydrocarbon liquid; an internal phase, wherein the internal phase of the drilling fluid comprises water; and a surfactant, wherein the surfactant: (A) comprises a hydrophobic tail group having a carbon chain length greater than or equal to 16; (B) has a boiling point greater than or equal to 400° F. (204.4° C.); and (C) is in at least a sufficient concentration such that the surfactant spontaneously forms reverse-micelles.

According to another embodiment, a method of using the invert emulsion drilling fluid comprises: introducing the drilling fluid into a well.

DETAILED DESCRIPTION

As used herein, the words "comprise," "have," "include," and all grammatical variations thereof are each intended to have an open, non-limiting meaning that does not exclude additional elements or steps.

As used herein, a "fluid" is a substance having a continuous phase that can flow and conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase; whereas a heterogeneous fluid has more than one distinct phase. A colloid is an example of a heterogeneous fluid. A colloid can be: a slurry, which includes a continuous liquid phase and undissolved solid particles as the dispersed phase; an emulsion, which includes a continuous liquid phase and at least one dispersed phase of immiscible liquid droplets; or a foam, which includes a continuous liquid phase and a gas as the dispersed phase. As used herein, the term "emulsion" means a colloid in which an aqueous liquid is the continuous (or external) phase and a hydrocarbon liquid is the dispersed (or internal) phase. As used herein, the term "invert emulsion" means a colloid in which a hydrocarbon liquid is the external phase and an aqueous liquid is the internal phase. Of course, there can be more than one internal phase of the emulsion or invert emulsion, but only one external phase. For example, there can be an external phase which is adjacent to a first internal phase, and the first internal phase can be adjacent to a second internal phase. Any of the phases of an emulsion or invert emulsion can contain dissolved materials and/or undissolved solids.

A "gel" refers to a substance that does not easily flow and in which shearing stresses below a certain finite value fail to produce permanent deformation. A substance can develop gel strength. The higher the gel strength, the more likely the substance will become a gel. Conversely, the lower the gel strength, the more likely the substance will remain in a fluid state. Although there is not a specific dividing line for determining whether a substance is a gel, generally, a substance with a 10 minute gel strength greater than 100 lb/100 ft$^2$ (47.88 Pa) will become a gel. Alternatively, a substance with a 10 minute gel strength less than 100 lb/100 ft$^2$ (47.88 Pa) will generally remain in a fluid state.

Oil and gas hydrocarbons are naturally occurring in some subterranean formations. A subterranean formation containing oil or gas is sometimes referred to as a reservoir. A reservoir may be located under land or off shore. In order to produce oil or gas, a wellbore is drilled into a reservoir or adjacent to a reservoir.

A well can include, without limitation, an oil, gas, or water production well, an injection well, or geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet of the wellbore. As used herein, "into a well" means and includes into any portion of the well, including into the wellbore or into the near-wellbore region via the wellbore.

A wellbore is formed using a drill bit. A drill string can be used to aid the drill bit in drilling through a subterranean formation to form the wellbore. The drill string can include a drilling pipe. During drilling operations, a drilling fluid, sometimes referred to as a drilling mud, may be circulated downwardly through the drilling pipe, and back up an annulus between the wall of the wellbore and the outside of the drilling pipe. The drilling fluid performs various functions, such as cooling the drill bit, maintaining the desired pressure in the well, and carrying drill cuttings upwardly through the annulus.

Invert emulsion drilling fluids can be used in water-sensitive formations, for example a shale formation. When an emulsion drilling fluid containing water is used in a water-sensitive formation, the water can adversely affect the formation. Some of the adverse effects can include swelling or sloughing of the subterranean formation, or gumbo formation. As such, an invert emulsion drilling fluid can be used to help prevent some of these adverse effects.

However, when an invert emulsion drilling fluid is used in a high-temperature formation problems can occur. As used herein, the phrase "high-temperature formation" means a formation that has a bottomhole temperature greater than 400° F. (204.4° C.). As used herein, the term "bottomhole" means the portion of the subterranean formation to be drilled. One example of a problem that can occur is the invert emulsion drilling fluid can become unstable. As used herein, a "stable" invert emulsion drilling fluid means that the invert emulsion will not cream, flocculate, or coalesce, and that the majority of any undissolved solids will not settle.

There are several ways to help maintain the stability of an invert emulsion drilling fluid for use in a high-temperature formation. One example is the amount of water in the invert emulsion can be decreased. It is not uncommon to have to decrease the amount of water to 2% by volume of the drilling fluid (an oil-to-water ratio "O/W ratio" of 98:2).

However, water is readily available and has a lower cost compared to other liquids. Therefore, decreasing the amount of water in the drilling fluid can substantially increase the cost of the fluid.

The amount of water in the invert emulsion drilling fluid can be increased to help reduce costs, but additives are generally then required to create a stable emulsion. These additives can be quite costly. Therefore, there is a need for an invert emulsion drilling fluid that can be used in high-temperature formations that has desirable properties and is less expensive compared to other drilling fluids.

Another problem that can occur is that the flash point of a drilling fluid can be quite low, depending on the boiling point of the ingredients. The flash point of a volatile material is the lowest temperature at which the material can vaporize to form an ignitable mixture in air. Serious problems can occur when using a fluid that has a low flash point in a high-temperature formation. By including ingredients in a drilling fluid that have relatively high boiling points, the flash point of the fluid can be increased.

It has been discovered that an invert emulsion drilling fluid containing a surfactant having a hydrophobic tail group with a carbon chain length greater than or equal to 16 and a boiling point greater than or equal to 400° F. (204.4° C.) can be used in high-temperature wells. The surfactant can be in at least a sufficient concentration such that the surfactant spontaneously forms reverse-micelles.

A surfactant is an amphiphilic molecule, comprising a hydrophobic tail group and a hydrophilic head group. The hydrophilic head can be charged. A cationic surfactant includes a positively-charged head. An anionic surfactant includes a negatively-charged head. A zwitterionic surfactant includes both a positively- and negatively-charged head. A surfactant with no charge is called a non-ionic surfactant.

If a surfactant is in a sufficient concentration in a solution, then the surfactant molecules can form micelles. A "micelle" is an aggregate of surfactant molecules dispersed in a solution. A surfactant in an oil solution can form reverse-micelles with the hydrophobic tails in contact with the hydrocarbon solvent, sequestering the hydrophilic heads in the center of the reverse-micelle. Conversely, a surfactant in an aqueous solution can form micelles with the hydrophilic heads in contact with the surrounding aqueous solvent, sequestering the hydrophobic tails in the micelle center. The surfactant must be in a sufficient concentration to form a reverse-micelle or micelle, known as the critical micelle concentration. The critical micelle concentration is the concentration of surfactant above which reverse-micelles or micelles are spontaneously formed.

It is desirable for a drilling fluid to have many different properties, such as rheology, fluid loss, and stability. If any test (e.g., rheology or stability) requires the step of mixing, then the invert emulsion drilling fluid is mixed according to the following procedures. A known volume (in units of barrels) of the external phase is added to a mixing container and the container is then placed on a mixer base. The motor of the base is then turned on and maintained at 11,000 revolutions per minute (rpm). Any of the following ingredients are then added to the external phase and mixed for at least 5 minutes before adding the next ingredient, wherein the ingredients are added in order of the first ingredient to last ingredient as follows: the surfactant; emulsifiers; a viscosifier and/or a suspending agent; a fluid loss additive; the internal phase; additive to simulate drilling solids; and a weighting agent. The ingredients can be added at a stated concentration of weight by volume of the drilling fluid, for example, in units of pounds per barrel (ppb) of the drilling fluid. It is to be understood that any mixing is performed at ambient temperature and pressure (about 71° F. (22° C.) and about 1 atm (0.1 MPa)).

It is also to be understood that if any test (e.g., rheology or stability) requires the test be performed at a specified temperature and possibly a specified pressure, then the temperature and pressure of the drilling fluid is ramped up to the specified temperature and pressure after being mixed at ambient temperature and pressure. For example, the drilling fluid can be mixed at 71° F. (22° C.) and 1 atm (0.1 MPa) and then placed into the testing apparatus and the temperature of the drilling fluid can be ramped up to the specified temperature. As used herein, the rate of ramping up the temperature is in the range of about 3° F./min to about 5° F./min (about 1.67° C./min to about 2.78° C./min). After the drilling fluid is ramped up to the specified temperature and possibly pressure, the drilling fluid is maintained at that temperature and pressure for the duration of the testing.

A desirable property of a colloid is that the internal phase of the colloid is uniformly distributed throughout the external phase. In the case of an emulsion, a surfactant or an emulsifier can be used to uniformly distribute the internal liquid phase throughout the external liquid phase. In the case of a slurry, a suspending agent can be used to uniformly distribute the undissolved solids throughout the external liquid phase. As used herein, a "stable" invert emulsion drilling fluid means that the invert emulsion will not cream, flocculate, or coalesce, and that the majority of any undissolved solids will not settle after being tested as follows. As used herein, the term "cream" means at least some of the droplets of the internal phase converge towards the surface or bottom of the emulsion (depending on the relative densities of the liquids making up the external and internal phases). The converged droplets maintain a discrete droplet form. As used herein, the term "flocculate" means at least some of the droplets of the internal phase combine to form small aggregates in the emulsion. As used herein, the term "coalesce" means at least some of the droplets of the internal phase combine to form larger drops in the emulsion. Stability testing is performed according to API 13I Recommended Practice for Laboratory Testing of Drilling Fluids, by placing the drilling fluid in a stainless steel ageing cell. The ageing cell is then pressurized with nitrogen gas to prevent the fluid from vaporizing and placed in a hot rolling oven at a specified temperature. The container is then hot rolled at the specified temperature for a specified amount of time. The ageing cell is then removed from the rolling oven and visually inspected to determine if the drilling fluid is stable.

Another desirable property of a drilling fluid is that the fluid exhibit good rheology. Rheology is a measure of how a material deforms and flows. As used herein, the "rheology" of a drilling fluid is measured according to API 13B-2 section 6.3, Recommended Practice for Field Testing of Oil-based Drilling Fluids as follows. The drilling fluid is mixed. The drilling fluid is placed into the test cell of a rotational viscometer, such as a FANN® Model 35 viscometer, fitted with a Bob and Sleeve attachment and a spring number 1. The drilling fluid is tested at the specified temperature and ambient pressure, about 1 atm (0.1 MPa). Rheology readings are taken at multiple rpm's, for example, at 3, 6, 100, 200, 300, and 600.

Another desirable property is a low plastic viscosity (PV). Usually, an increase in the viscosity of a base fluid, excess colloidal solids, or both, will increase the plastic viscosity ("PV") of a fluid. Plastic viscosity (PV) is obtained from the Bingham-Plastic rheological model and represents the viscosity of a fluid when extrapolated to an infinite shear rate. The PV value can have an effect on the equivalent circulating density ("ECD") and the rate of penetration ("ROP") of a drilling fluid. ECD is the effective circulating density exerted by a fluid against the formation, taking into account the flow rate and pressure drop in the annulus above the point being considered and measured as the difference in a drilling fluid's measured surface density at the well head and the drilling fluid's equivalent circulating density downhole. A low ECD is when the difference between the surface density and the equivalent circulating density downhole is relatively small. A high PV may increase the ECD due to a greater pressure drop in the annulus caused by internal fluid friction. A low PV may help minimize the amount of density increase, or equivalent circulating density caused by pumping the fluid. ROP is how quickly a drill bit forms a wellbore (i.e., the rate at which the drill bit penetrates a subterranean formation). A low PV may indicate that the fluid is capable of drilling rapidly because of, among other things, the low viscosity of fluid exiting the drill bit and the ability to use an increased flow rate. In addition to desiring a low PV value, it is also desirable to have a low ECD and a high ROP. As used herein, the "plastic viscosity" of a drilling fluid is obtained from the Bingham-Plastic rheological model and calculated as the difference between the 600 rpm and 300 rpm dial readings from the rheology testing, expressed in units of cP. A reading of less than 50 cP can be considered a good result.

It is also desirable to have a low yield point. The yield point ("YP") is defined as the value obtained from the Bingham-Plastic rheological model when extrapolated to a shear rate of zero. As used herein, the "yield point" of a drilling fluid is calculated as the difference between the plastic viscosity and the 300 rpm dial reading, expressed in units of lb/100 ft$^2$. A reading of less than 25 lb/100 ft$^2$ can be considered a good result.

A substance can develop gel strength. As used herein, the "initial gel strength" of a drilling fluid is measured according to API 13B-2 section 6.3, Recommended Practice for Field Testing of Oil-based Drilling Fluids as follows. After the rheology testing of the substance is performed, the substance is allowed to sit in the test cell for 10 seconds (s). The motor of the viscometer is then started at 3 rpm. The maximum deflection on the dial reading is then multiplied by 0.48 to obtain the initial gel strength in units of lb/100 ft$^2$. As used herein, the "10 min gel strength" is measured as follows. After the initial gel strength test has been performed, the substance is allowed to sit in the test cell for 10 minutes (min). The motor of the viscometer is then started at 3 rpm. The maximum deflection on the dial reading is multiplied by 0.48 to obtain the 10 min gel strength in units of lb/100 ft$^2$.

Another desirable property of a drilling fluid is a low fluid loss. Fluid loss test results can be used to indicate how much fluid might leak off into a formation. As used herein, the "fluid loss" of a drilling fluid is tested according to API 13B-2 section 7, Recommended Practice for Field Testing of Oil-based Drilling Fluids procedure at a specified temperature and pressure differential as follows. The drilling fluid is mixed. The heating jacket of the testing apparatus is preheated to approximately 6° C. (10° F.) above the specified temperature. The drilling fluid is stirred for 5 min using a field mixer. The drilling fluid is poured into the filter cell. The testing apparatus is assembled with a filter paper inserted into the apparatus. The drilling fluid is heated to the specified temperature. When the drilling fluid reaches the specified temperature, the lower valve stem is opened and the specified pressure differential is set (measured in units of pounds force per square inch "psi" or megapascals "MPa"). A timer is started and filtrate out of the testing apparatus is collected in a separate volumetric container. The testing is performed for 30 min. The total volume of filtrate collected is read. Fluid loss is measured in milliliters (mL) of fluid collected in 30 min. The total mL of fluid loss is then multiplied by 2 to obtain the API fluid loss for the drilling fluid in units of mL/30 min.

Another desirable property of a drilling fluid is a good electrical stability. The electrical stability (ES) of an oil-based drilling fluid is a property related to its emulsion stability and oil-wetting capability. ES is determined by applying a voltage-ramped, sinusoidal electrical signal across a pair of parallel, flat-plate electrodes immersed in the drilling fluid. The resulting current remains low until a threshold voltage is reached, whereupon the current rises very rapidly. This threshold voltage is referred to as the ES of the oil-based drilling fluid and is defined as the voltage (in peak volts) measured when the current reaches 61 microamperes (μA). The "electrical stability" of a drilling fluid is measured according to API 13B-2 section 10, Recommended Practice for Field Testing of Oil-based Drilling Fluids procedure as follows. The drilling fluid is screened through a Marsh funnel. The drilling fluid is placed in a viscometer cup maintained at 50° C.±2° C. (120° F.±5° F.). The drilling fluid is hand-stirred with an electrode probe for approximately 10 s to ensure that the composition and temperature of the drilling fluid are uniform. The electrode probe is positioned such that it does not touch the bottom or sides of the container and the electrode surfaces are completely covered by the drilling fluid. The voltage ramp test is conducted. The average of the two ES measurements is the ES reported in units of volts (V).

Another desirable property of a drilling fluid is a low shear strength. The shear strength of a drilling fluid can be used to indicate whether the drilling fluid will develop excessive shear strength under static conditions. Excessive shear strength means that high pumping pressures are required to "break circulation" of the drilling fluid. Shear strength is the strength of a material or component against the type of yield or structural failure where the material or component shears and can be expressed in units of lb/100 ft$^2$. Shear strength is generally measured at a specified time after the drilling fluid has been mixed and the composition is tested at a specified temperature and possibly a specified pressure. For example, shear strength can be measured at a time in the range of about 48 to about 72 hours after the composition is mixed and the composition is tested at a temperature of 120° F. (49° C.). As used herein, the shear strength of a drilling fluid is measured as follows in accordance with API RP 13B-1, Appendix A. The drilling fluid is mixed and given 16 to 96 hours to develop shear strength. Next, a metal shear tube 3.5 inches (89 mm) in length, with an outside diameter of 1.4 inches (36 mm), and wall thickness of 0.008 inches (0.02 mm) is placed onto the surface of the drilling fluid. A platform or "stage" is then placed directly on top of the metal shear tube. Incremental amounts of a known weight are sequentially placed on the platform until the metal shear tube is submerged approximately 2 inches into the surface of the drilling fluid. The depth submerged is then accurately measured and recorded along with the combined weight of the platform and the incrementally added weights. When inches, grams, gallons, and pounds are the units employed, the following equation can be utilized to calculate shear strength:

$$S = \frac{3.61(Z + W)}{L} - 0.256A$$

where S=shear strength in lb/100 ft$^2$, Z=weight of shear tube in grams, W=total shear weight in grams (platform+incrementally added weights), L=submerged depth of shear tube in inches, and A is the drilling fluid density in lb/gal. A good result for shear strength of a drilling fluid is less than 250 lb/100 ft$^2$, when measured at 48 hours at a temperature of 71° F. and a pressure of 1 atmosphere.

Another desirable property of a drilling fluid is a good sag factor. As used herein, only drilling fluids that are considered "stable" after performing stability testing are tested for the "sag factor" (SF) as follows. The drilling fluid is placed into a high-temperature, high-pressure aging cell. The drilling fluid is then static aged at a specified temperature and a specified pressure for a specified period of time. The specific gravity (SG) of the drilling fluid is measured at the top of the fluid and at the bottom part of the fluid in the aging cell. The sag factor is calculated using the following formula: $SF=SG_{bottom}/(SG_{bottom}+SG_{top})$. A sag factor of greater than 0.53 indicates that the fluid has a potential to sag; therefore, a sag factor of less than or equal to 0.53 is considered to be a good result.

According to an embodiment, an invert emulsion drilling fluid comprises: an external phase, wherein the external phase of the drilling fluid comprises a hydrocarbon liquid; an internal phase, wherein the internal phase of the drilling fluid comprises water; and a surfactant, wherein the surfactant: (A) comprises a hydrophobic tail group having a carbon chain length greater than or equal to 16; (B) has a boiling point greater than or equal to 400° F. (204.4° C.); and (C) is in at least a sufficient concentration such that the surfactant spontaneously forms reverse-micelles.

According to another embodiment, a method of using the invert emulsion drilling fluid comprises: introducing the drilling fluid into a well.

The discussion of preferred embodiments regarding the drilling fluid or any ingredient in the drilling fluid, is intended to apply to the composition embodiments and the method embodiments. Any reference to the unit "gallons" means U.S. gallons.

The drilling fluid is an invert emulsion. The invert emulsion includes only one external phase and at least one internal phase. The external phase comprises a hydrocarbon liquid. The external phase can include dissolved materials or undissolved solids. Preferably, the hydrocarbon liquid is selected from the group consisting of: a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof. Crude oil can be separated into fractional distillates based on the boiling point of the fractions in the crude oil. An example of a suitable fractional distillate of crude oil is diesel oil. A commercially-available example of a fatty acid ester is PETROFREE® ESTER base fluid, marketed by Halliburton Energy Services, Inc. The saturated hydrocarbon can be an alkane or paraffin. Preferably, the saturated hydrocarbon is an alkane. The paraffin can be an isoalkane (isoparaffin), a linear alkane (paraffin), or a cyclic alkane (cycloparaffin). Example of suitable alkanes include SARA-LINE® 185V synthetic base fluid (a mixture of alkanes with carbon chain lengths predominately of C10 to C20), available from Shell MDS in Malaysia and BAROID ALKANE™ base fluid, marketed by Halliburton Energy Services, Inc. Examples of suitable paraffins include, but are not limited to: BIO-BASE 360® (an isoalkane and n-alkane); BIO-BASE 300™ (a linear alkane); BIO-BASE 560® (a blend containing greater than 90% linear alkanes); and ESCAID 110™ (a mineral oil blend of mainly alkanes and cyclic alkanes). The BIO-BASE liquids are available from Shrieve Chemical Products, Inc. in The Woodlands, Tex. The ESCAID liquid is available from ExxonMobil in Houston, Tex. The unsaturated hydrocarbon can be an alkene, alkyne, or aromatic. The alkene can be an isoalkene, linear alkene, or cyclic alkene. The linear alkene can be a linear alpha olefin or an internal olefin. An example of a linear alpha olefin is NOVATEC™, available from M-I SWACO in Houston, Tex. Examples of internal olefins include, ENCORE® drilling fluid and ACCOLADE® drilling fluid, marketed by Halliburton Energy Services, Inc.

The drilling fluid includes an internal phase. The internal phase comprises water. The water can be selected from the group consisting of: freshwater, seawater, brine, and any combination thereof in any proportion. The drilling fluid can further include a water-soluble salt. Preferably, the salt is selected from the group consisting of sodium chloride, calcium chloride, calcium bromide, potassium chloride, potassium bromide, magnesium chloride, and any combination thereof. The drilling fluid can contain the water-soluble salt in a concentration in the range of about 35 to about 90 pounds per barrel (ppb) (348 kilograms per cubic meter "kg/m$^3$") of the water. The internal phase can be in a concentration in the range of about 0.5% to about 50% by volume of the external phase. The internal phase can also be in a concentration of about 2% to about 20% by volume of the external phase.

The drilling fluid includes the surfactant. The surfactant comprises a hydrophilic head group and a hydrophobic tail group. According to an embodiment, the hydrophilic head group comprises an amide, an imide, an ether (e.g., hydroxypropyl, polyoxyethylene glycol, sorbitol, or glycerol), a polyethylene oxide, a quaternary amine, a phenol, or an allyl carboxylic acid (e.g., polyacrylic acid) functional group. The hydrophobic tail group has a carbon chain length greater than or equal to 16 (C16). The hydrophobic tail group can have a carbon chain length in the range of C16 to C30, preferably in the range of C18 to C24. The surfactant can comprise a carbon-carbon double or triple bond, wherein the carbon-carbon double bond or triple bond can be located on any carbon, e.g., from C1 to C16, C17, C18, etc.

The surfactant has a boiling point (b.p.) greater than or equal to 400° F. (204.4° C.). The surfactant can have a b.p. in the range of 400° F. to about 800° F. (204.4° C. to about 426.7° C.), preferably about 450° F. to about 700° F. (about 232.2° C. to about 371.1° C.). The hydrophobic tail group of the surfactant can be linear or branched. According to an embodiment, the hydrophilic head group, the hydrophobic tail group, or both the hydrophilic head and hydrophobic tail of the surfactant is branched. The degree of branching can vary. The amount of branching can have an effect on the boiling point of the surfactant. Moreover, the amount of branching and the chain length of the hydrophobic tail can also have an effect on the b.p. of the surfactant. According to an embodiment, the surfactant is highly-branched (i.e., one or more of the head or tail groups of the surfactant is highly branched). According to an embodiment, the amount of branching, the chain length, or both the amount of branching and the chain length of the hydrophobic tail are selected such that the surfactant has a b.p. greater than or equal to 400° F. (204.4° C.).

Examples of suitable surfactants include, but are not limited to, hexadecanamide; heptadecanamide; octadecanamide; hexadecenamide; heptadecanamide; octadecanamide; ricinoleamide; petroselinamide; vaccenamide; linoleamide; linolenamide; eleostearamide; punicamide; licanamide; gadoleamide; arachidonamide; 5-eicosenamide; 5-docosenamide; cetoleamide; erucamide; 5,13-docosadienamide; selacholeamide; imides prepared with saturated fatty acids (e.g., stearic acid, arachidic acid, behenic acid, lignoceric acid, or cerotic acid); unsaturated fatty acids listed above; ethers from fatty alcohols (e.g., polyoxyethylene glycol cetyl alcohol, ethyloxylated n-hexacosanol, ethyloxylated hydroxypropylated n-octacosanol, etyloxylated n-triacontanol, ethyloxlated cocceryl alcohol, and ethoxylated oleyl alcohol); quaternary amines (e.g., octadearyl dimethyl ammonium chloride, and dehydrogenated tallow dimethyl ammonium chloride); esters made from the acid groups listed above (e.g., sorbitan trioleate, glycerol dioleated, poyoxyethylene glycol dioleate, and ethyloxylated castor oil); and imadozolines (e.g., stearyl imadozolines, and 2-phenol-2 imidozolines). The surfactant can also comprise a benzene ring, wherein the functional groups listed above are substituted on the benzene ring (e.g., phenolics, p-aminophenol, diazoaminobenzene, o-hydroxypropiophenone, and ethoxylated phenols). A commercially-available example of a suitable surfactant is COLA®MID 16, available from Colonial Chemical, Inc. in South Pittsburg, Tenn.

The surfactant is in at least a sufficient concentration such that the surfactant spontaneously forms reverse-micelles (i.e., the critical micelle concentration). It is believed that the carbon chain length and/or the amount of branching can promote reverse-micelle formation. According to an embodiment, the carbon chain length of the hydrophobic tail group and/or the amount of branching, and the concentration of the surfactant are selected such that the surfactant spontaneously forms reverse-micelles. In one embodiment, the surfactant is in a concentration of at least 7 ppb (27 kg/m$^3$) of the drilling fluid. In another embodiment, the surfactant is in a concentration in the range of about 7 to about 30 ppb (about 27 to about 116 kg/m$^3$) of the drilling fluid. In another embodiment, the surfactant is in a concentration in the range of about 10 to about 25 ppb (about 39 to about 97 kg/m$^3$) of the drilling fluid.

The drilling fluid can further include an emulsifier. The emulsifier can be selected from the group consisting of calcium oleate, a linear octadecenamide, phosphatide, and combinations thereof. Commercially-available examples of suitable emulsifiers include, but are not limited to, INVER-MUL® NT, EZ-MUL® NT, DRILTREAT®, and combinations thereof, marketed by Halliburton Energy Services, Inc. According to an embodiment, the emulsifier is in a concentration of at least 10 ppb (39 kg/m$^3$) of the drilling fluid. The emulsifier can also be in a concentration in the range of about 10 to about 50 ppb (about 39 to about 193 kg/m$^3$) of the drilling fluid.

The drilling fluid can further include a viscosifier. The viscosifier can be selected from the group consisting of an aluminum-silicate organophilic clay, a magnesium-silicate organophilic clay, dimer and trimer fatty acids, stearic acid, and combinations thereof. Commercially-available examples of a suitable viscosifier include, but are not limited to, GELTONE® V, SUSPENTONE™, RM-63™, RHE-MOD™ L, VIS-PLUS®, and combinations thereof, marketed by Halliburton Energy Services, Inc. According to an embodiment, the viscosifier is in a concentration of at least 2 ppb (8 kg/m$^3$) of the drilling fluid. The viscosifier can also be in a concentration in the range of about 2 to about 20 ppb (about 8 to about 77 kg/m$^3$) of the drilling fluid.

The drilling fluid can further include a thinner. The thinner can be selected from the group consisting of sulfo fatty acid-sodium salt, sulfonic acid salt, fatty alcohols, and combinations thereof. Commercially-available examples of a suitable thinner include, but are not limited to, OMC® 42, DEEP-TREAT™, and combinations thereof, marketed by Halliburton Energy Services, Inc. According to an embodiment, the thinner is in at least a sufficient concentration such that the drilling fluid has a yield point of less than 30 lb/100 ft$^2$. According to another embodiment, the thinner is in at least a sufficient concentration such that the drilling fluid has a 10 min gel strength of less than 50 lb/100 ft$^2$. According to yet another embodiment, the thinner is in a concentration of at least 0.05 ppb (0.2 kg/m$^3$) of the drilling fluid. The thinner can also be in a concentration in the range of about 0.05 to about 5 ppb (about 0.2 to about 19 kg/m$^3$) of the drilling fluid.

The drilling fluid can further include a weighting agent. The weighting agent can be selected from the group consisting of barite, hematite, manganese tetroxide, calcium carbonate, and combinations thereof. Commercially-available examples of a suitable weighting agent include, but are not limited to, BAROID®, BARACARB®, BARODENSE®, MICROMAX™, and combinations thereof, marketed by Halliburton Energy Services, Inc. According to an embodiment, the weighting agent is in a concentration of at least 200 ppb (773 kg/m$^3$) of the drilling fluid. The weighting agent can also be in a concentration in the range of about 200 to about 1,500 ppb (about 773 to about 5,800 kg/m$^3$) of the drilling fluid. According to another embodiment, the weighting agent is in at least a sufficient concentration such that the drilling fluid has a density in the range of about 9 to about 20 pounds per gallon (ppg) (about 1.078 to about 2.397 kilograms per liter "kg/L"). Preferably, the weighting agent is in at least a sufficient concentration such that the drilling fluid has a density in the range of about 9 to about 18 ppg (about 1.1 to about 2.4 kg/L).

The drilling fluid can further include a fluid loss additive. The fluid loss additive can be selected from the group consisting of a modified lignitic compound, methylestyrene-co-acrylate, a substituted styrene copolymer, and combinations thereof. Commercially-available examples of a suitable fluid loss additive include, but are not limited to, DURATONE® HT and ADAPTA®, marketed by Halliburton Energy Services, Inc. According to an embodiment, the fluid loss additive is in a concentration of at least 5 ppb (19 kg/m$^3$) of the drilling fluid. The fluid loss additive can also be in a concentration in the range of about 5 to about 30 ppb (about 19 to about 116 kg/m$^3$) of the drilling fluid.

The drilling fluid can also include a friction reducer. Commercially-available examples of a suitable friction reducer include, but are not limited to, BARO-LUBE GOLD SEAL™, TORQ-TRIM® II, graphitic carbon, and combinations thereof, marketed by Halliburton Energy Services, Inc. The friction reducer can be in a concentration of at least 0.5 ppb (2 kg/m$^3$) of the drilling fluid. In an embodiment, the friction reducer is in a concentration in the range of about 0.5 to about 5 ppb (about 2 to about 19 kg/m$^3$) of the drilling fluid.

According to an embodiment, the drilling fluid has a plastic viscosity of less than 50 cP. The drilling fluid can also have a plastic viscosity in the range from about 12 to about 50 cP. According to another embodiment, the surfactant is in a concentration such that the drilling fluid has a plastic viscosity in the range from about 12 to about 50 cP.

The drilling fluid can have a 10 min gel strength of less than 100 lb/100 ft$^2$. The drilling fluid can also have a 10 min gel strength of less than 50 lb/100 ft$^2$. According to an embodiment, the surfactant is in a sufficient concentration such that the drilling fluid has a 10 min gel strength of less than 50 lb/100 ft$^2$. According to another embodiment, if the drilling fluid includes the thinner, then the thinner and the surfactant are in a sufficient concentration such that the drilling fluid has a 10 min gel strength of less than 50 lb/100 ft$^2$.

The drilling fluid can have an API fluid loss of less than 10 mL/30 min at a temperature of 302° F. (150° C.) and a pressure differential of 500 psi (3.4 MPa). According to an embodiment, the surfactant is in a sufficient concentration such that the drilling fluid has an API fluid loss of less than 10 mL/30 min at a temperature of 302° F. (150° C.) and a pressure differential of 500 psi (3.4 MPa). Without being limited by theory, it is believed that the formation of reverse-micelles allows the surfactant to function as a fluid loss additive. For example, the reverse-micelles can link or join together and form bridges. Depending on the size of the pores of a subterranean formation and the size of the bridges, the bridges can help restrict fluid flow from the wellbore into the formation or also from the formation into the wellbore (depending on the specific oil or gas operation being performed). According to another embodiment, if the drilling fluid includes a fluid loss additive, then the fluid loss additive and the surfactant are in a sufficient concentration such that the drilling fluid has an API fluid loss of less than 10 mL/30 min at a temperature of 302° F. (150° C.) and a pressure differential of 500 psi (3.4 MPa).

According to an embodiment, the drilling fluid is stable after static aging for 16 hours at a temperature of at least 475° F. (246° C.). According to another embodiment, the drilling fluid has a sag factor less than or equal to 0.53 after static aging for 16 hours at a temperature of at least 475° F. (246° C.) and a pressure of 500 psi (3.4 MPa). According to an embodiment, the surfactant is in a sufficient concentration such that the drilling fluid is stable and has a sag factor less than or equal to 0.53 after static aging for 16 hours at a temperature of at least 475° F. (246° C.) and a pressure of 500 psi (3.4 MPa). Without being limited by theory, it is believed that the formation of reverse-micelles allows the surfactant to function as a suspending agent. For example, the reverse-micelles can help suspend insoluble particles in the drilling fluid, and also help prevent creaming, flocculation, or coalescence. According to another embodiment, the drilling fluid has an electrical stability of greater than 300 volts (V).

According to the method embodiments, the methods include the step of introducing the drilling fluid into the well. The well can be an oil, gas, or water production well, a geothermal well, or an injection well. The well can include a wellbore. The wellbore can penetrate or be adjacent to a reservoir. The step of introducing the drilling fluid can be for the purpose of drilling the wellbore. According to an embodiment, the well has a bottomhole temperature of at least 400° F. (204.4° C.). The well can also have a bottomhole temperature in the range of about 400 to about 600° F. (about 204.4 to about 315.6° C.). The well can also have a bottomhole temperature in the range of about 450 to about 550° F. (about 232.2 to about 287.8° C.). The drilling fluid can be in a pumpable state before and during introduction into the subterranean formation. The well can include an annulus. The step of introducing the drilling fluid can include introducing the drilling fluid into a portion of the annulus.

The methods can further include the step of introducing a spacer fluid into the well after the step of introducing the drilling fluid. The methods can also further include the step of introducing a cement composition into the well after the step of introducing the drilling fluid and/or the spacer fluid. As used herein, a "cement composition" is a mixture of at least cement and water, and possibly additives. As used herein, the term "cement" means an initially dry substance that, in the presence of water, acts as a binder to bind other materials together. An example of cement is Portland cement. The step of introducing the cement composition can be for the purpose of at least one of the following: well completion; foam cementing; primary or secondary cementing operations; well-plugging; and gravel packing. The cement composition can be in a pumpable state before and during introduction into the subterranean formation. The step of introducing can include introducing the cement composition into a portion of an annulus.

The method embodiments can also include the step of allowing the cement composition to set. The step of allowing can be performed after the step of introducing the cement composition into the well. The method can include the additional steps of perforating, fracturing, or performing an acidizing treatment, after the step of allowing.

EXAMPLES

To facilitate a better understanding of the preferred embodiments, the following examples of certain aspects of the preferred embodiments are given. The following examples are not the only examples that could be given according to the preferred embodiments and are not intended to limit the scope of the invention.

For the data contained in the following tables, the concentration of any ingredient in a drilling fluid is expressed as pounds per barrel of the drilling fluid (abbreviated as "ppb"), unless otherwise indicated.

Each of the drilling fluids were mixed and tested according to the procedure for the specific test as described in The Detailed Description section above. Rheology testing, initial and 10 minute gel strength, plastic viscosity, and yield point tests were conducted at a temperature of 150° F. (65.6° C.). API fluid loss testing was conducted at a pressure differential of 500 psi (3.4 MPa) and a temperature of 302° F. (121° C.) for the drilling fluids. Stability and sag factor testing was performed after static aging for 16 hours at a temperature of either 475° F. (246.1° C.) or 500° F. (260° C.) and a pressure of 500 psi (3.4 MPa). Shear strength testing was performed at a temperature of 71° F. (21.7° C.), a pressure of 14.7 psi (0.1 MPa), and a time of 16 hours for all of the drilling fluids except fluids #3 and #4 which had a time of 48 hours.

Table 1 contains a list of the ingredients and their respective concentrations for nine different drilling fluids. Each of the drilling fluids had a density of 15 pounds per gallon "ppg" (1.797 kg/L), except for drilling fluids #3 and #4 which had a density of 18.5 ppg (2.217 kg/L). The oil-to-water ratio (O/W Ratio) is listed for each fluid. The external phase for the drilling fluids was either diesel oil or SARALINE® 185V alkane mixture and is expressed in units of barrels ("bbl"). INVERMUL® NT is an emulsifier of calcium oleate, EZ MUL® NT is an emulsifier of a linear octadecenamide, GELTONE® V is an aluminum-silicate organophilic clay viscosifier, SUSPENTONE™ is a magnesium-silicate organophilic clay viscosifier, DURATONE® HT is a modified lignitic fluid loss additive, fluid loss additive 1 and fluid loss additive 2 are substituted styrene copolymers, REV DUST® is an altered calcium montmorillonite clay that is used to simulate drilling solids, barite is a weighting agent, and OMC® 42 is a sulfo fatty acid-sodium salt thinner. Some of the drilling fluids contained COLA®MID 16, 9-octadecenamide, N-(2-hydroxypropyl)-, (z), as the surfactant.

TABLE 1

|  | 1 | 2 | 3 | 4 | 5 | 6 | 7 | 8 | 9 |
|---|---|---|---|---|---|---|---|---|---|
| O/W Ratio | 98/2 | 95/5 | 95/5 | 95/5 | 90/10 | 90/10 | 85/15 | 85/15 | 80/20 |
| SARALINE ® 185 V (bbl) | 0.59 | 0.57 |  |  | 0.54 | 0.54 | 0.52 | 0.52 | 0.47 |
| Diesel Oil (bbl) |  |  | 0.483 | 0.483 |  |  |  |  |  |
| INVERMUL ® NT | 16.67 | 16.67 | 15.75 | 15.75 | 22.95 |  | 22.40 |  |  |
| COLA ® MID 16 |  |  |  | 15.75 |  | 22.95 | 12.80 | 9.60 | 9.84 |
| EZ MUL ® NT | 8.33 | 8.33 | 7.87 | 7.87 | 13.11 | 13.11 |  |  | 16.39 |
| Lime | 13.33 | 13.33 | 23.62 | 15.75 | 13.11 | 8.20 | 12.80 | 9.60 | 8.20 |

TABLE 1-continued

|  | 1 | 2 | 3 | 4 | 5 | 6 | 7 | 8 | 9 |
|---|---|---|---|---|---|---|---|---|---|
| GELTONE ® V | 6.67 | 6.67 | 7.87 | 3.94 | 4.92 | 4.92 | 4.80 | 2.40 | 3.28 |
| SUSPENTONE ™ | 3.33 | 3.33 |  | 1.97 | 4.92 | 4.92 | 4.80 | 3.20 | 4.92 |
| DURATONE ® HT | 16.67 | 16.67 | 39.37 | 39.37 | 24.59 | 24.59 | 16.00 | 16.00 | 16.39 |
| Fluid loss additive-1 | 13.33 | 13.33 | 11.81 | 2.95 | 4.92 | 4.92 |  |  |  |
| Fluid loss additive-2 |  |  |  |  |  |  | 12.80 | 12.80 | 13.11 |
| Water (bbl) | 0.01 | 0.03 | 0.025 | 0.025 | 0.07 | 0.07 | 0.105 | 0.105 | 0.14 |
| Calcium chloride | 1.17 | 2.83 | 5.91 | 5.91 | 5.57 | 5.57 | 8.32 | 8.32 | 8.52 |
| REV DUST ® | 33.33 | 33.33 | 39.37 | 39.37 | 32.79 | 32.79 | 32.00 | 32.00 | 32.79 |
| Barite | 658.33 | 653.33 | 1066.93 | 1066.93 | 634.43 | 634.43 | 620.80 | 620.80 | 621.31 |
| OMC ® 42 | 0.83 | 0.83 | 0.49 | 1.97 | 1.23 | 1.23 | 1.20 | 1.60 | 1.23 |

Table 2 contains rheology data, plastic viscosity, and initial and 10 min gel strength data for the drilling fluids. As can be seen in Table 2, drilling fluid #1 having an O/W ratio of 98/2 exhibited good results. Drilling fluids #2 through #4 contained a higher water content at an O/W ratio of 95/5 compared to drilling fluid #1. Drilling fluid #2 containing SARALINE® 185V as the external phase exhibited better results compared to fluid #3 containing diesel oil as the external phase. The addition of COLA®MID 16 as the surfactant to drilling fluid #4 improved the rheology and gel strengths of the fluid compared to fluid #3. Drilling fluids #5 and #6, which had a low water content, exhibited comparable results. Moreover, as can be seen with reference to fluids #7 through #9, the addition of COLA®MID 16 to drilling fluids having a higher water content enabled the fluids to exhibit comparable results compared to a fluid having a lower water content. Therefore, it appears that COLA®MID 16 can be used in drilling fluids having a higher water content to provide good rheology, plastic viscosity, and gel strengths to the drilling fluids.

lb/100 ft$^2$. It is believed that the concentration of the clay-based additives (GELTONE® V and SUSPENTONE™) in the fluids can be reduced, which should lower the shear strength. The micelle structure that is formed with the COLA®MID 16 and the higher concentration of water seems to be adequate to keep the insoluble particles from settling. It is believed that reducing the concentration of clay might create a gel structure that will become more stable at higher temperatures and reduce the need to use other surfactants or thinners, which break down at higher temperatures.

TABLE 4

|  | 1 | 2 | 3 | 4 | 5 | 6 | 7 | 8 | 9 |
|---|---|---|---|---|---|---|---|---|---|
| Shear Strength (lb/100 sq. ft.) | 487 |  |  | 1,300 | 361 | 890 | 649 | 660 | 722 |

TABLE 2

|  | 1 | 2 | 3 | 4 | 5 | 6 | 7 | 8 | 9 |
|---|---|---|---|---|---|---|---|---|---|
| 600 rpm | 85 | 73 | Off scale | 159 | 61 | 90 | 132 | 110 | 163 |
| 300 rpm | 47 | 41 | Off scale | 83 | 32 | 49 | 74 | 57 | 95 |
| 200 rpm | 34 | 31 | 248 | 58 | 23 | 36 | 53 | 41 | 72 |
| 100 rpm | 21 | 20 | 160 | 35 | 14 | 21 | 31 | 23 | 43 |
| 6 rpm | 8 | 8 | 47 | 7 | 3 | 6 | 7 | 5 | 10 |
| 3 rpm | 8 | 8 | 37 | 5 | 3 | 5 | 5 | 4 | 8 |
| Plastic Viscosity (cP) | 38 | 32 |  | 76 | 29 | 41 | 58 | 53 | 68 |
| Initial Gel Strength (lb/100 sq. ft.) | 16 | 11 | 42 | 7 | 7 | 7 | 8 | 6 | 9 |
| 10 min. Gel Strength (lb/100 sq. ft.) | 32 | 19 | 48 | 23 | 13 | 12 | 18 | 12 | 12 |

Table 3 contains API fluid loss data for the drilling fluids. As can be seen in Table 3, the concentration of the surfactant and the possible inclusion of other ingredients may need to be adjusted in order to produce a fluid with a fluid loss of less than 10 mL/30 min.

TABLE 3

|  | 1 | 2 | 3 | 4 | 5 | 6 | 7 | 8 | 9 |
|---|---|---|---|---|---|---|---|---|---|
| HTHP fluid loss (mL/30 min) | 13.6 | 7.4 |  |  |  | 54 | 4.8 | 24.0 |  |

Table 4 contains shear strength and yield point data for the drilling fluids. As can be seen in Table 4, the static shear strength values after all of the fluids were static aged were higher than the desired range between 50 lb/100 ft$^2$ and 250

TABLE 4-continued

|  | 1 | 2 | 3 | 4 | 5 | 6 | 7 | 8 | 9 |
|---|---|---|---|---|---|---|---|---|---|
| Yield Point (lb/100 sq. ft.) | 9 | 9 |  | 7 | 3 | 8 | 16 | 4 | 27 |

Table 5 contains sag factor, stability, and electrical stability data for the drilling fluids. It should be noted that only the drilling fluids that were considered "stable" were tested for the sag factor. As can be seen in Table 5, the concentration of the surfactant may need to be adjusted in order to provide the drilling fluid with a sag factor of less than 0.53. As can also be seen, the electrical stabilities' of all the fluids were above the 300 volt range that is needed to prevent the solids from becoming water wet. The fluids treated with COLA®MID 16 exhibit lower ES values, because the COLA®MID 16 contains several hydrophilic groups to help stabilize the oil-based fluids that were formulated with higher concentrations of water.

TABLE 5

|  | 1 | 2 | 3 | 4 | 5 | 6 | 7 | 8 | 9 |
|---|---|---|---|---|---|---|---|---|---|
| Stability and Sag Factor Temp. | 500° F. | 500° F. |  | 475° F. | 500° F. | 500° F. | 500° F. | 500° F. | 500° F. |
| Sag Factor |  | 0.577 |  | 0.508 | 0.629 | 0.530 | 0.587 | 0.652 | 0.519 |
| Stability |  |  |  |  | Stable |  |  |  |  |
| Electrical Stability (volts) | 2,000+ | 1,282 |  | 2,000 | 760 | 581 | 566 | 520 | 393 |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. An invert emulsion drilling fluid comprising:
   an external phase, wherein the external phase of the drilling fluid comprises a hydrocarbon liquid;
   an internal phase, wherein the internal phase of the drilling fluid comprises water, and wherein the internal phase is in a concentration of about 2% to about 20% by volume of the external phase;
   a surfactant, wherein the surfactant:
   (A) comprises a hydrophobic tail group having a carbon chain length greater than or equal to 16, wherein the tail group is branched;
   (B) has a boiling point in the range of about 450° F. to about 700° F.; and
   (C) is in a concentration in the range of about 12 to about 25 pounds per barrel (about 39 to about 97 kilograms per cubic meter) of the drilling fluid, wherein the amount of branching of the tail group is selected such that the surfactant has a boiling point in the range of about 450° F. to about 700° F.;
   an emulsifier selected from the group consisting of calcium oleate, a linear octadecenamide, phosphatide, and combinations thereof; and
   a viscosifier selected from a group consisting of an aluminum-silicate organophilic clay, a magnesium-silicate organophilic clay, dimer and trimmer fatty acids, stearic acid, and combinations thereof.

2. The drilling fluid according to claim 1, wherein the hydrocarbon liquid is selected from the group consisting of: a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof.

3. The drilling fluid according to claim 1, wherein the water is selected from the group consisting of freshwater, seawater, brine, and any combination thereof in any proportion.

4. The drilling fluid according to claim 1, wherein the hydrophobic tail group has a carbon chain length in the range of C18 to C24.

5. The drilling fluid according to claim 1, wherein the surfactant further comprises a hydrophilic head group, and wherein the hydrophilic head group comprises an amide, an imide, an ether, a polyethylene oxide, a quaternary amine, a phenol, or an allyl carboxylic acid functional group.

6. The drilling fluid according to claim 1, wherein the drilling fluid has an electrical stability of greater than 300 volts.

7. The drilling fluid according to claim 1, wherein the drilling fluid has a plastic viscosity in the range from about 12 to about 50 cP.

8. The drilling fluid according to claim 1, wherein the surfactant is in a sufficient concentration such that the drilling fluid has an API fluid loss of less than 10 mL/30 min at a temperature of 302° F. (150° C.) and a pressure differential of 500 psi (3.4 MPa).

9. The drilling fluid according to claim 1, wherein the drilling fluid is stable after static aging for 16 hours at a temperature of at least 475° F. (246° C.).

10. The drilling fluid according to claim 1, wherein the drilling fluid has a sag factor less than or equal to 0.53 after static aging for 16 hours at a temperature of at least 475° F. (246° C.) and a pressure of 500 psi (3.4 MPa).

11. The drilling fluid according to claim 1, wherein the surfactant is in a sufficient concentration such that the drilling fluid is stable and has a sag factor less than or equal to 0.53 after static aging for 16 hours at a temperature of at least 475° F. (246° C.) and a pressure of 500 psi (3.4 MPa).

12. The drilling fluid according to claim 1, wherein the drilling fluid is used in a well.

13. The drilling fluid according to claim 12, wherein the well is an oil, gas, or water production well, a geothermal well, or an injection well.

14. The drilling fluid according to claim 12, wherein the well has a bottomhole temperature in the range of about 400 to about 600° F. (about 204.4 to about 315.6° C).

15. An invert emulsion drilling fluid comprising:
an external phase, wherein the external phase of the drilling fluid comprises a hydrocarbon liquid;
an internal phase, wherein the internal phase of the drilling fluid comprises water, and wherein the internal phase is in a concentration of about 2% to about 20% by volume of the external phase;
a surfactant, wherein the surfactant:
  (A) comprises a hydrophobic tail group having a carbon chain length greater than or equal to 16;
  (B) has a boiling point in the range of about 450° F. to about 700° F.;
  (C) is in a concentration in the range of about 15 to about 30 pounds per barrel (about 58 to about 116 kilograms per cubic meter) of the drilling fluid; and
  (D) comprises a hydrophilic head group, wherein the hydrophilic head group comprises an amide, an imide, an ether, a polyethylene oxide, a quaternary amine, a phenol, or an allyl carboxylic acid functional group,
  wherein the hydrophilic head group, the hydrophobic tail group, or both the hydrophilic head and hydrophobic tail of the surfactant is branched, and wherein the amount of branching, the chain length, or both the amount of branching and the chain length are selected such that the surfactant has a boiling point in the range of about 450° F. to about 700° F.;
an emulsifier selected from the group consisting of calcium oleate, a linear octadecenamide, phosphatide, and combinations thereof; a thinner selected from a group consisting of sulfo fatty acid-sodium salt, sulfonic acid salt, fatty alcohols, and combination thereof; and
a viscosifier selected from a group consisting of an aluminum-silicate organophilic clay, a magnesium-silicate organophilic clay, dimer and trimmer fatty acids, stearic acid, and combinations thereof.

16. The drilling fluid according to claim 15, wherein the hydrophobic tail group has a carbon chain length in the range of C18 to C24.

17. The drilling fluid according to claim 1, wherein the drilling fluid further comprises:
a thinner selected from a group consisting of sulfo fatty acid-sodium salt, sulfonic acid salt, fatty alcohols, and combination thereof;
a weighting agent selected from a group consisting of barite, hematite, manganese tetroxide, calcium carbonate, and combinations thereof; and
a fluid loss additive selected from the group consisting of a modified lignitic compound, methylestryrene-co-acrylate; a substituted styrene copolymer, and combinations thereof.

18. The method according to claim 1, wherein the surfactant comprises 9-octadecenamide, N-(2-hydroxypropyl)-.

* * * * *